Nov. 20, 1962 W. S. SCHAEFFER 3,064,412
COMBINATION GUARD FINGER AND PRESSURE PLATE
FOR CUTTER BAR ASSEMBLIES
FOR MOWING MACHINES
Filed March 21, 1960 2 Sheets-Sheet 1
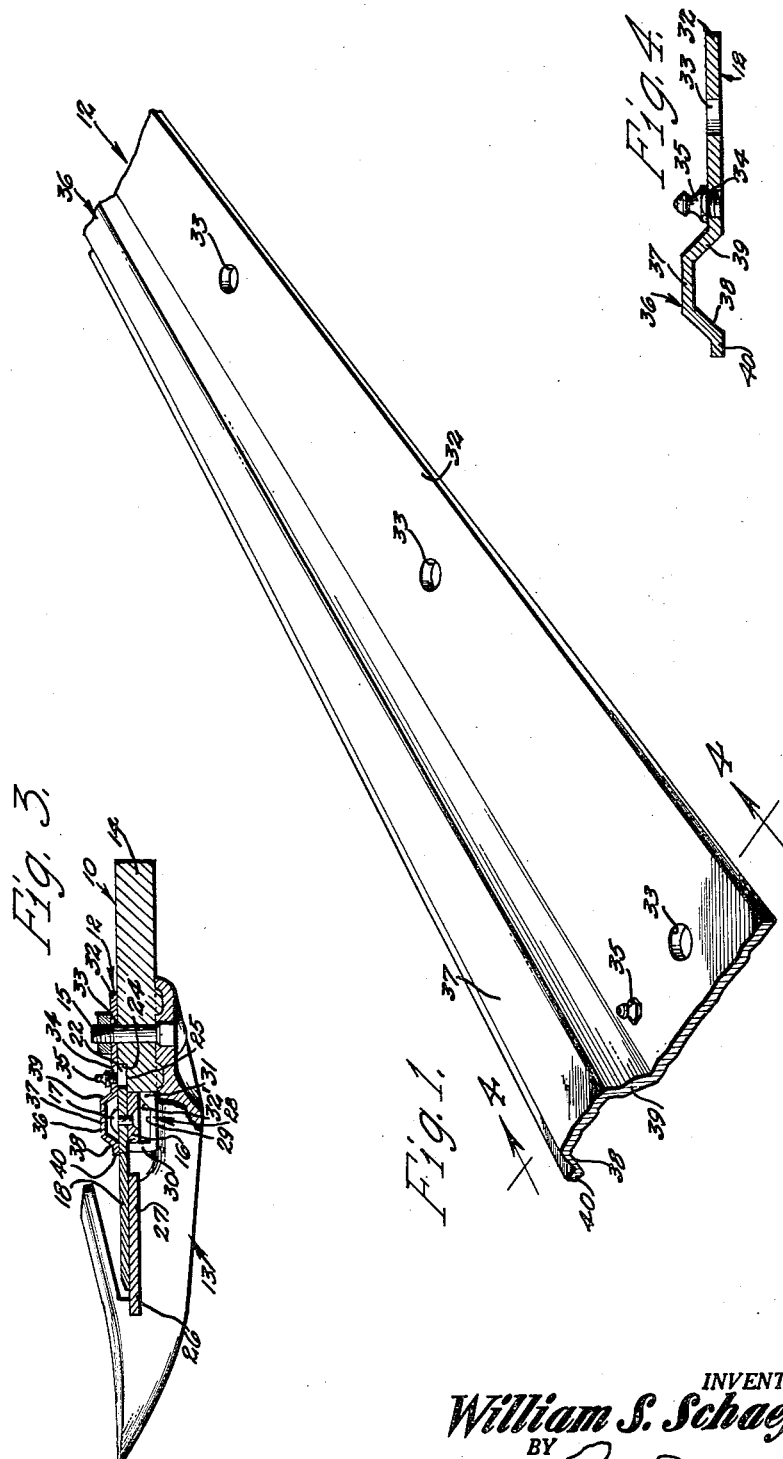
INVENTOR.
*William S. Schaeffer*
BY
ATTORNEY Nov. 20, 1962 W. S. SCHAEFFER 3,064,412
COMBINATION GUARD FINGER AND PRESSURE PLATE
FOR CUTTER BAR ASSEMBLIES
FOR MOWING MACHINES
Filed March 21, 1960 2 Sheets-Sheet 2
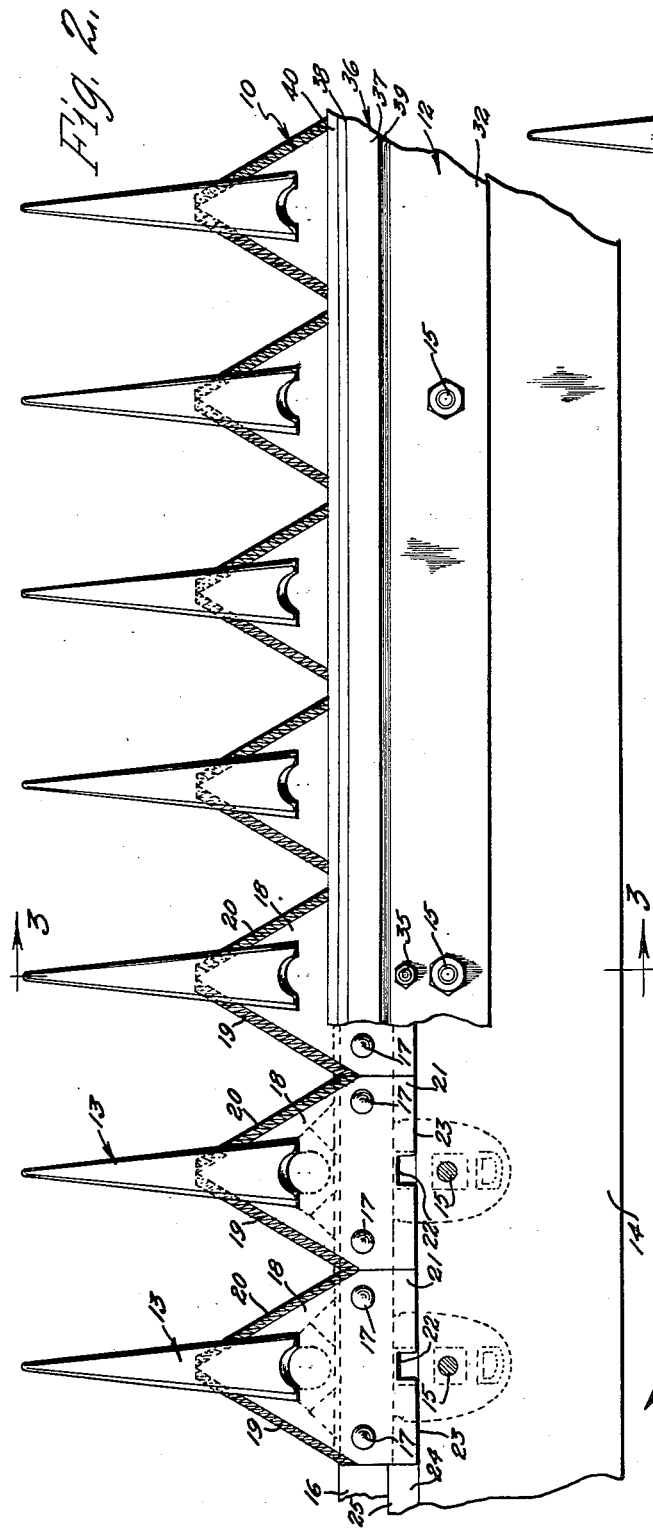
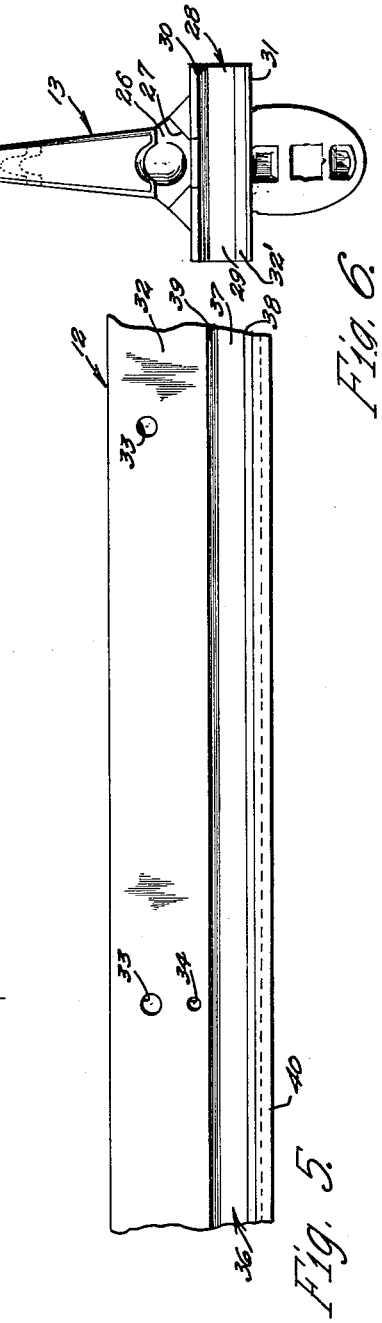
INVENTOR.
William S. Schaeffer
BY
ATTORNEY

United States Patent Office 3,064,412
Patented Nov. 20, 1962

3,064,412
COMBINATION GUARD FINGER AND PRESSURE PLATE FOR CUTTER BAR ASSEMBLIES FOR MOWING MACHINES
William Sherman Schaeffer, South Webster, Ohio
Filed Mar. 21, 1960, Ser. No. 16,347
4 Claims. (Cl. 56—305)

This invention relates to improvements in the cutter bar mechanism for mowing machines and more particularly to an improved cutter bar guard finger and pressure plate for the cutter bar of such a machine.

Mowing machines using reciprocating cutter bars have been in use for many years and it is a known fact that, due to improper pressure on the cutter bars and lack of proper lubrication, the life of the cutter bar has been limited even under ordinary wear and tear and proper maintenance.

Most of the cutter bar guards in use at the present time have open throats which permit stones, sticks and other debris to become jammed between the cutter bar guard finger and the cutter bar. This action causes twisting of the cutter bar and affects the operation of the mowing machine.

An object of this invention, therefore, is first to provide a closed mouth cutter bar guard finger and secondly to provide a cutter bar pressure plate, whereby the cutter bar guard finger and cutter bar pressure plate provide a closed raceway for the cutter bar to operate in to prevent stones, sticks and other debris from becoming jammed between the cutter bar and cutter bar guard finger.

Another object of the invention is to provide a cutter bar pressure plate that is extended longitudinally of the cutter bar so that pressure on the cutter bar is uniformly and continuously applied from end to end of the cutter bar.

A further object of the invention is to provide grease gun fittings in the cutter bar pressure plate so that the raceway in which the cutter bar reciprocates may be lubricated.

A still further object of the invention is to provide a cutter bar guard finger that is provided with oppositely extending channel portions that, cooperating with successivly mounted cutter bar guard fingers, provides a closed raceway for the bottom of the cutter bar.

A still further object of the invention is to provide a cutter bar pressure plate that is provided with a longitudinally extending channel formation therein that provides a closed raceway for the top of the cutter bar.

A still further object of the invention is to provide a cutter bar pressure plate and cutter bar guard finger assembly that completely seals the cutter bar to prevent debris from damaging the cutter bar, thereby increasing the length of time the cutter bar may be used without the replacement thereof, as well as providing easy maintenance, and less cost of upkeep.

With the above and other objects and advantages in view, the invention consists of the novel details of construction, arrangement and combination of parts more fully hereinafter described, claimed and illustrated in the accompanying drawings, in which:

FIG. 1 is a perspective view of a pressure plate forming a part of the present invention;

FIG. 2 is a top plan view, partly in section and partly broken away, of a cutter bar assembly embodying the present invention;

FIG. 3 is a vertical sectional view on the line 3—3 of FIG. 2;

FIG. 4 is a sectional view on a reduced scale on the line 4—4 of FIG. 1;

FIG. 5 is a bottom plan view of the pressure plate of FIG. 1; and

FIG. 6 is a top plan view of a cutter bar guard finger embodying the invention.

Referring more in detail to the drawings, wherein like parts are designated by like reference numerals, the reference numeral 10 is used to generally designate a cutter bar assembly for a mowing machine.

The present invention includes a pressure plate 12, FIGS. 1 and 5 and a cutter bar guard finger 13, FIG. 6, and the plate 12 and guard finger 13 are combined in operational coaction with each other to provide applicant's invention.

The cutter bar assembly 10 includes a finger bar 14, to which is secured at predetermined intervals, by means of bolts 15, the guard fingers 13. Mounted for reciprocal movement in relation to the finger bar 14 is a knife bar 16 to which is secured by means of rivets 17 a plurality of cutting knives 18. Each of the knives 18 has a cutting portion of inverted V-formations provided with bevelled cutting edges 19 and 20, and a base or mounting portion 21 that is provided with a cutout or recess 22 therein centrally of the rear edge 23 thereof. The rear edges 23 of the knives 18 reciprocate in a longitudinally extending groove 24 that is provided in the upper surface of the longitudinally extending inner edge 25 of the finger bar 14.

The forward portion of the knives 18 reciprocate over ledger plates 26 that are mounted in recesses 27 in the fingers 13, and the cutting edges 19 and 20 thereof are protected by the guard fingers 13.

The knife bar 16 reciprocates in a channel portion 28 that is secured by welding to the finger 13. The channel portion 28 extends transversely of the finger 13 and communicates with the cutouts or recesses 22 in the knives 18. The channel portion 28 comprises a base portion 29, a vertically disposed wall portion 30 that abuts that portion of the rear edge of the ledger plate 26 that extends into the recess 27, as shown in FIG. 6, and a vertically disposed wall portion 31 that is parallel to and in spaced relation to the wall portion 30. The wall portion 31 has an inclined inner surface 32', and the rear surface of the wall portion 31 abuts the forward longitudinal edge of the finger bar 14 as does one longitudinal edge of the knife bar 16. The wall portion 31 of the channel portion 28 is of less height than the wall portion 30 so that the upper longitudinal edge of the wall portion 31 will abut the undersurface of the knife bar 16 and the inner surface of the upper edge portion of the wall portion 30 will abut the longitudinally extending edge portion of the knife bar 16, that is in opposed relation to that edge thereof that is in abutting relation to the finger bar 14. Thus, the knife bar 16 is completely protected from contact with debris and dirt by the channel portion 28 of the guard finger 13.

Positioned on the upper surface of the finger bar 14 is the pressure plate 12 which extends longitudinally of the finger bar 14 in superimposed contactual relation therewith. The pressure plate 12 has a longitudinally extending flat rectangular shaped base portion 32 and one longitudinal edge that is in spaced parallel relation to the rear edge of the finger bar 14. There is provided in the base portion 32 of the plate 12 a longitudinally extending row of equi-spaced apertures 33 which selectively coact with certain of the bolts 15 whereby the cutter bar guard finger 13, finger bar 14 and pressure plate 12 are retained in fixed assembled relation to each other. There is also provided in the pressure plate 12 a longitudinally extending row of internally threaded apertures 34, which are of a size to receive grease gun fittings 35. There are a less number of the apertures 34 than there are of the apertures 33, but each of the apertures 34 are forwardly of and in alined spaced relation to the apertures 33.

The longitudinal edge of the base portion 32 of the base plate 12, opposite to the rear longitudinal edge thereof that is parallel to the rear longitudinal edge of the finger bar 14 has a semi-hexagonal shaped channel portion 36 formed integrally therewith. The channel portion 36 has a flat base portion 37 and outwardly and upwardly inclined diverging wall portions 38 and 39. The longitudinally extending lower edge of the wall portion 39 is integral with the longitudinally extending edge of the base portion 32 of the pressure plate 12 and the longitudinally extending edge of the wall portion 38 has a longitudinally extending flange 40 integral therewith that lies in the same horizontally disposed plane as the base portion 32. When the pressure plate 12 is in position, as in FIGS. 2 and 3, the channel portion 36 is in inverted superimposed spaced relation to that portion of the base or mounting portions 21 of the knives 18 that has the knife bar 16 secured thereto. The flange 40 of the pressure plate is, therefore, in a position to engage the upper surface of the knives 18 so that the longitudinal edge thereof extends longitudinally of and beyond the wall portion 30 of the channel portion 28 of the guard finger 13. The pressure plate 12 is so positioned, therefore, that constant uniform pressure is applied to the upper surfaces of the base or mounting portions 21 of the knives 18 at all times.

The invention contemplates providing a continuous and closed raceway in which the knife bar 16 and the base or mounting portions 21 of the knives 18 will reciprocate. The channel portion 36 of the pressure plate 12 provides the upper longitudinally extending portion of the raceway and when the outer end edge portions of the channel portions 28 of the guard fingers 13 are in contactual relation to successively positioned channel portions 28 of successively positioned guard fingers 13, the lower longitudinally extending lower portion of the raceway is provided. With the base or mounting portions 21 of the knives 18 and the knife bar 16 completely enclosed in the raceway, debris and stones cannot become jammed in the reciprocating parts to damage the cutting bar assembly 10.

When the cutting bar assembly 10 is first assembled grease can be placed in the channel portions 28 of the guard fingers 13 and in the channel portion 36 of the pressure plate 12 and by applying a grease gun to the grease gun fittings 35, grease may be added to the moving parts as found necessary. The grease fed through the grease gun fittings 35 will enter the cutouts or recesses 22 of the base or mounting portions 21 of the knives 18 and thus be distributed to the moving parts of the cutter bar assembly 10. Thus lubrication will be supplied to the moving parts of the cutter bar assembly at all times, since it is the tendency of grease to progress from the grease gun fittings 35 into the clearances that exist between the moving parts. The grease will also tend to keep dust and plant juices from entering the clearances between the moving parts and gumming up and creating friction between the moving parts.

It is believed that from the foregoing description the operation of the invention and results obtained by the installation thereof, will be apparent to those skilled in the art and it is to be understood that changes in the minor details of construction, arrangement and combination of parts may be resorted to provided they fall within the spirit of the invention and the scope of the appended claims.

Having thus described the invention what is claimed as new and desired to be secured by Letters Patent is:

1. The combination with a cutter bar assembly having a finger bar, and a cutter bar mounted in reciprocal moving relation to the finger bar of a plurality of cutter bar guard fingers secured to the finger bar at predetermined intervals and receiving said cutting bar therein and a pressure plate extending longitudinally of the finger bar and secured thereto, said pressure plate overlapping said cutter bar, said guard fingers having coacting channel portions thereon positioned below said cutting bar and said pressure plate having a longitudinally extending channel portion formed integrally therewith that is positioned above said cutting bar and coacts with the channel portions of said guard fingers to provide a closed raceway for said cutter bar, the channel portion of said pressure plate having a base portion integral with one edge thereof and a longitudinally extending flange portion integral with the opposite edge thereof, the channel portions of said guard fingers having a base portion and a pair of vertically disposed wall portions with the inner surface of one of said wall portions adjacent the upper edge thereof abutting the outer edge of said cutter bar and the upper edge of the other of said wall portions abutting the under surface of said cutter bar.

2. A cutter bar assembly comprising a finger bar, a plurality of guard fingers secured to said finger bar at predetermined intervals, a knife bar having a plurality of knives secured thereto mounted for reciprocal movement in relation to said finger bar, a pressure plate secured to said finger bar and overlapping said knife bar and the knives secured thereto, said pressure plate comprising a base portion having a longitudinally extending semi-hexagonal shaped channel portion formed integral with one edge thereof and a longitudinally extending flange portion having one edge thereof formed integral with said channel portion, each of said guard fingers having a channel portion secured thereto that coacts with said knife bar, the channel portion on said guard finger having a base portion and a pair of vertically disposed wall portions and the inner surface of one of said wall portions adjacent the upper edge thereof abuts the outer edge of said knife bar and the upper edge of the other of said wall portions abuts the under surface of said knife bar adjacent one edge thereof.

3. A cutter bar assembly as in claim 2, wherein a longitudinally extended row of spaced apertures are provided in the base portion of said pressure plate whereby said pressure plate is secured to said cutter bar assembly, a longitudinally extending row of internally threaded apertures in said base portion that are selectively alined in spaced parallel relation to said first row of apertures and grease gun fittings connected to said internally threaded apertures.

4. A cutter bar assembly as in claim 2, wherein the outer edges of the channel portions on said guard fingers will coact with the outer edges of the channel portions on successively mounted guard fingers to provide a closed raceway for said knife bar.

References Cited in the file of this patent

UNITED STATES PATENTS

| | | |
|---|---|---|
| 401,714 | Murray | Apr. 16, 1889 |
| 489,062 | Wilson | Jan. 3, 1893 |
| 1,083,072 | Ferbrache | Dec. 30, 1913 |
| 1,224,002 | Meinhardt | Apr. 24, 1917 |
| 1,816,868 | Privat | Aug. 4, 1931 |
| 2,024,309 | Smith | Dec. 17, 1935 |
| 2,152,265 | Matthews | Mar. 28, 1939 |
| 2,490,261 | Gable | Dec. 6, 1949 |
| 2,500,104 | Vutz | Mar. 7, 1950 |
| 2,654,987 | Mills et al. | Oct. 13, 1953 |
| 2,738,639 | Stearman et al. | Mar. 20, 1956 |

FOREIGN PATENTS

| | | |
|---|---|---|
| 380,073 | Great Britain | Aug. 29, 1932 |